(12) United States Patent
Natarajan et al.

(10) Patent No.: US 8,615,008 B2
(45) Date of Patent: Dec. 24, 2013

(54) DUPLICATING NETWORK TRAFFIC THROUGH TRANSPARENT VLAN FLOODING

(75) Inventors: Hari Natarajan, Bangalore (IN);
Eskinder Sahle, Arlington, VA (US);
Charles Helfinstine, Reston, VA (US);
Chris Oskuie, Chantilly, VA (US)

(73) Assignee: Foundry Networks LLC, San Jose, CA (US)

( * ) Notice: Subject to any disclaimer, the term of this patent is extended or adjusted under 35 U.S.C. 154(b) by 1005 days.

(21) Appl. No.: 11/827,524

(22) Filed: Jul. 11, 2007

(65) Prior Publication Data

US 2013/0259037 A1    Oct. 3, 2013

(51) Int. Cl.
*H04L 12/28*    (2006.01)
(52) U.S. Cl.
USPC .......................... 370/389; 370/390; 370/394
(58) Field of Classification Search
None
See application file for complete search history.

(56) References Cited

U.S. PATENT DOCUMENTS

| | | | |
|---|---|---|---|
| 7,009,968 B2 * | 3/2006 | Ambe et al. | 370/389 |
| 7,031,304 B1 * | 4/2006 | Arberg et al. | 370/360 |
| 7,188,189 B2 * | 3/2007 | Karol et al. | 709/238 |
| 7,292,573 B2 * | 11/2007 | LaVigne et al. | 370/390 |
| 7,506,065 B2 * | 3/2009 | LaVigne et al. | 709/245 |
| 7,555,562 B2 * | 6/2009 | See et al. | 709/240 |
| 7,606,203 B1 * | 10/2009 | Shabtay et al. | 370/332 |
| 7,690,040 B2 * | 3/2010 | Frattura et al. | 726/26 |
| 7,706,363 B1 * | 4/2010 | Daniel et al. | 370/389 |
| 7,747,737 B1 * | 6/2010 | Apte et al. | 709/224 |
| 8,239,960 B2 * | 8/2012 | Frattura et al. | 726/26 |
| 2005/0278565 A1 * | 12/2005 | Frattura et al. | 714/5 |

* cited by examiner

*Primary Examiner* — Brian O'Connor

(57) ABSTRACT

An approach to duplicating network traffic is described. In one approach, a method of creating multiple copies of network traffic is detailed. The method involves receiving network traffic, producing a duplicate copy of the network traffic, and forwarding the duplicate copy to a monitoring port. The monitoring port forwards copies to a number of indicated ports.

33 Claims, 14 Drawing Sheets

Network Device 920

Network Device 200

Exemplary Switch 300
(Port Mirroring)

Exemplary VLAN 350
(VLAN Flooding)

Flowchart 400

Network Device 500

Network Device 500

Network Device 500

Flowchart 600

Flowchart 700

Flowchart 800

DUPLICATING NETWORK TRAFFIC THROUGH TRANSPARENT VLAN FLOODING

BACKGROUND

There is a growing need, in the field of computer networks, to be able to monitor network traffic. A combination of government regulations, quality assurance responsibilities, and competitive necessities has resulted in an industry-wide need to be able to monitor traffic passing through a network. The level or type of monitoring may vary, depending upon the particular task being performed. For example, it might be desirable to monitor all traffic between a specific source and a specific destination, or to gather information about all traffic passing across the network that involves a specific protocol.

Unfortunately, the tools available to network administrators to perform this kind of monitoring are extremely limited. Many layer 2 devices offer a limited "port mirroring" option, which can create a single copy of traffic coming in on a single port, and output that copy to a single destination port. Port mirroring, used in this fashion, does not offer the ability to make multiple copies, e.g., for multiple different monitoring roles, nor does it allow for sending the copied traffic to different destinations.

Alternatively, a physical "tap" can be inserted in-line, and a portion of the signal can be physically diverted. This approach raises issues involving signal degradation, however; moreover, the equipment used in this approach can be extremely expensive.

Some vendors supply a limited software solution, which creates a set number of copies of traffic. However, software solutions are not scalable, particularly at the speed involved in modern network connections. Also, these approaches only create a limited number of copies of the traffic.

SUMMARY

An approach to duplicating network traffic is described. In one approach, a method of creating multiple copies of network traffic is detailed. The method involves receiving network traffic, producing a duplicate copy of the network traffic, and forwarding the duplicate copy to a monitoring port. The monitoring port forwards copies to a number of ports.

Another approach is provided, in which a network device is described. The network device includes a number of networking ports for receiving and transmitting data, and a switching fabric for routing network traffic between networking ports. The networking ports also include an input port, which is used to receive network traffic and is configured to create a duplicate copy of the network traffic. The networking ports also include a monitoring input port, coupled to the input port, which receives a duplicate copy, and is configured to create additional copies and forward them to a number of monitoring ports.

Another described approach details a computer usable medium having computer readable program code embodied therein for causing a computer system to execute a method of monitoring network traffic on a network device. This approach includes receiving the network traffic into an input port. The network traffic is duplicated, producing duplicate traffic. This duplicate traffic is diverted to a monitoring virtual local area network (VLAN), where it is received by a monitoring input port, which forwards a copy of this duplicate traffic to each available port in the VLAN.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
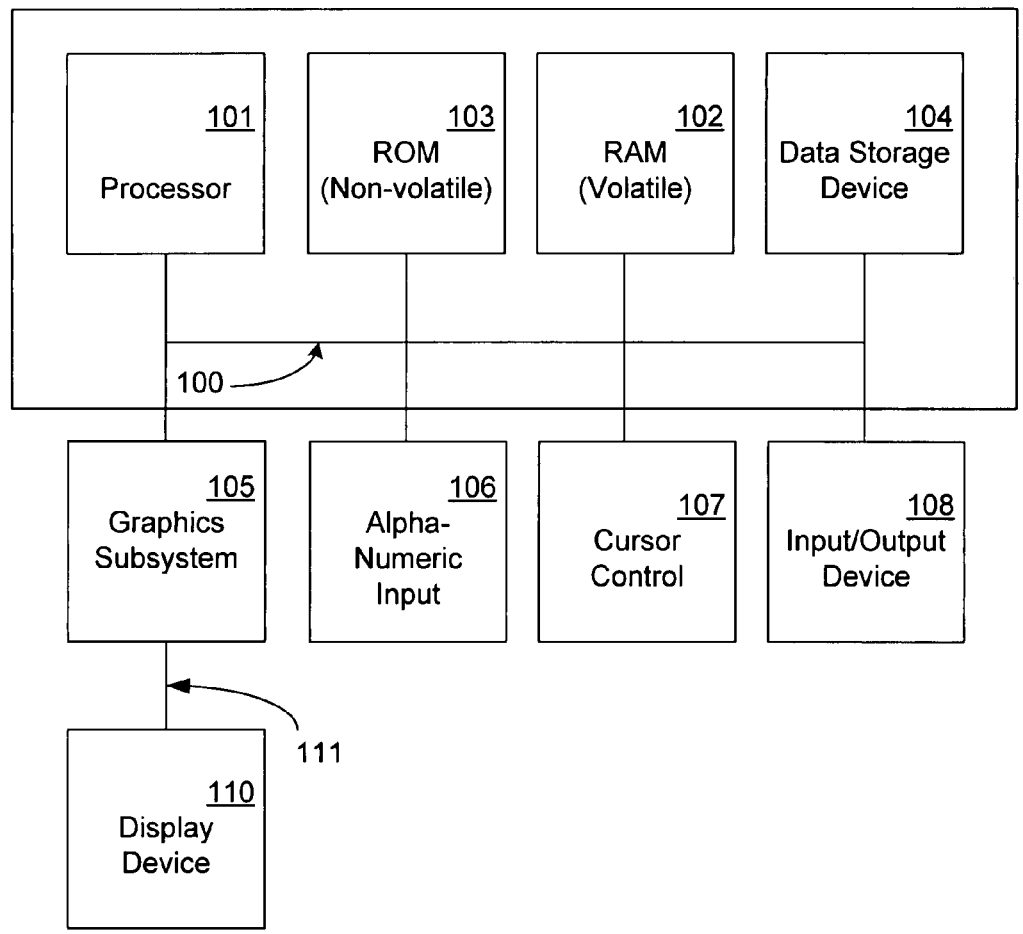
FIG. 1 is a block diagram of an exemplary computer system upon which embodiments of the present invention may be implemented.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 4) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices, such as computing system 112, typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.
Network Traffic Duplication Via Transparent VLAN Flooding In the following embodiments, an approach is described for creating an arbitrary number of copies of network traffic, and dispatching them to arbitrary destinations. This approach takes network traffic from any given network port, transparently duplicates it, and forwards the copies to an arbitrary number of network ports. One embodiment, involves using port mirroring to create a copy of the selected network traffic. This copy is sent to an input port for a VLAN. By disabling MAC learning for the input port, the traffic is duplicated across the entire VLAN, by means of VLAN flooding. By adjusting VLAN membership, different numbers of copies of the traffic can be created, and dispatched to different ports in the switch. Moreover, different types of traffic can be subjected to different types of monitoring, through the application of network traffic management rules.

Figure 2:
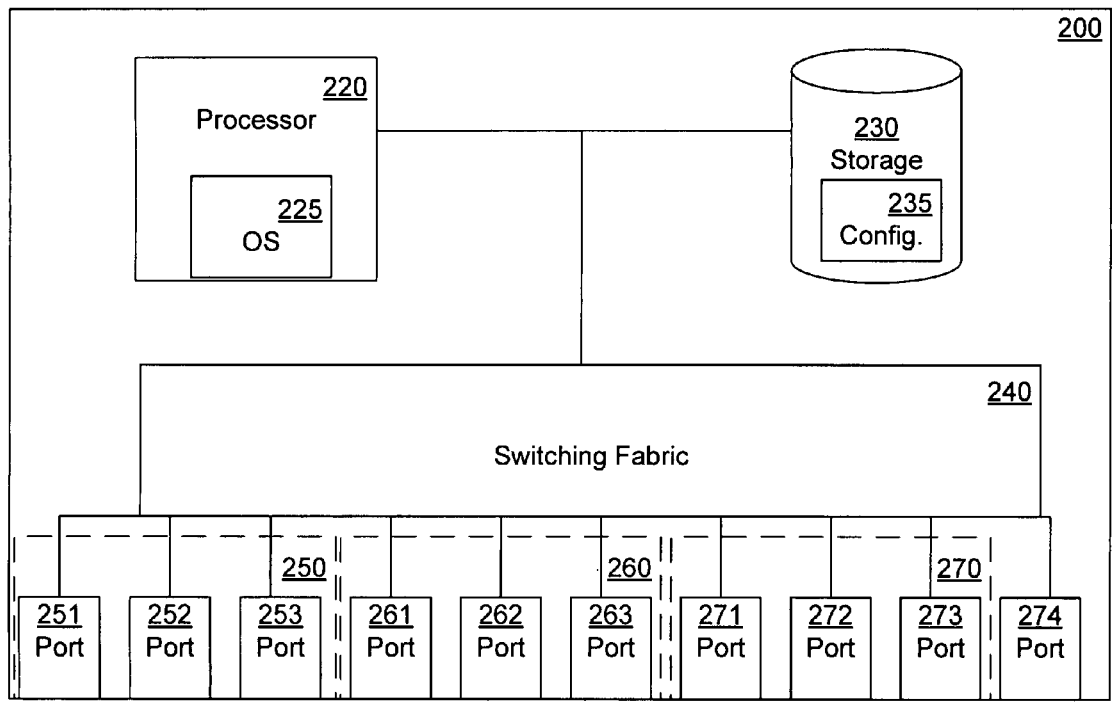
FIG. 2 is a block diagram of an exemplary network device, in accordance with one embodiment.

In another described embodiment, a layer 2 device, such as a switch, can be configured to enable network traffic monitoring for network traffic passing through the device. In this embodiment, the type of traffic to be monitored, as well as the number of copies to be made and the destinations for those copies, can be adjusted. In such embodiments, if an additional monitoring device needs to be added to the network, it is simply connected to the layer 2 device, and the appropriate port is added to the monitoring VLAN. Further functionality of the layer 2 device may be customized through the use of other networking rules, to provide a scalable, flexible, and robust solution to the need for network monitoring.
Exemplary Networking Device With reference now to FIG. 2, a block diagram of an exemplary network device 200 is depicted, in accordance with one embodiment. While network device 200 is shown as incorporating specific, enumerated features, it is understood that embodiments are well suited to applications involving additional, fewer, or different features or arrangements. Moreover, while network device 200, as shown, is a layer 2 device, it is understood that embodiments may be practiced on many different types of devices, e.g., a layer 2/3 device.

As shown, network device 200 includes processor 220, storage 230, switching fabric 240, and a number of communications ports, e.g., ports 251, 252, 253, 261, 262, 263, 271, 272, 273, and 274. Processor 220 executes instructions for controlling network device 200, and for managing traffic passing through network device 200. An operating system 225 is shown as executing on processor 220; in some embodiments, operating system 225 supplies the programmatic interface to network device 200.

Network device 200 is also shown as including storage 230. In different embodiments, different types of storage may be utilized, as well as differing amounts of storage. For example, in some embodiments, storage 230 may consist of flash memory, magnetic storage media, or any other appropriate storage type, or combinations thereof. In some embodiments, storage 230 is used to store operating system 225, which is loaded into processor 220 when network device 200 is initialized. Additionally, as shown, storage 230 contains configuration 235. Configuration 235 provides instructions for operating system 225 on how network device 200 is to be operated.

Network device 200 also includes switching fabric 240. In the depicted embodiment, switching fabric 240 is the hardware, software, or combination thereof that passes traffic between a source and a destination. Switching fabric 240, as shown, includes the packet processors, application-specific integrated circuits (ASICs), field programmable gate arrays (FPGAs), and/or controlling programming used to analyze network traffic, apply appropriate networking rules, and route data between ports in network device 200. In many of the embodiments described herein, it is understood that configuring or instructing a port to perform an action involves configuring or instructing that portion of the switching fabric that controls the indicated port to perform that action. For example, if port 251 is configured to implement port mirroring, the packet processor in switching fabric 240 responsible for controlling port 251 is so configured.

Network device 200 is shown as incorporating a number of communications ports. In the depicted device, these communications ports can be arbitrarily assigned to different virtual local area networks (VLANs), according to the instructions contained in configuration 235. Several exemplary VLANs are depicted, namely VLANs 250, 260, and 270. VLAN membership is configurable, and a single physical port may belong to multiple virtual LANs. Network device 200 receives network traffic from attached devices, e.g., computers, or other networking devices, and passes it to its intended destination by means of these communications ports.

Port Mirroring

One feature common to many layer 2 devices is port mirroring. Port mirroring allows traffic being received on one port to be duplicated, and the copy forwarded to a designated second port. Meanwhile, the original traffic is passed on to its intended destination, without further interference. While port mirroring, by itself, is an insufficient solution to the need for network traffic monitoring, embodiments described below make use of port mirroring in order to generate an initial copy of network traffic.

Figure 3A:
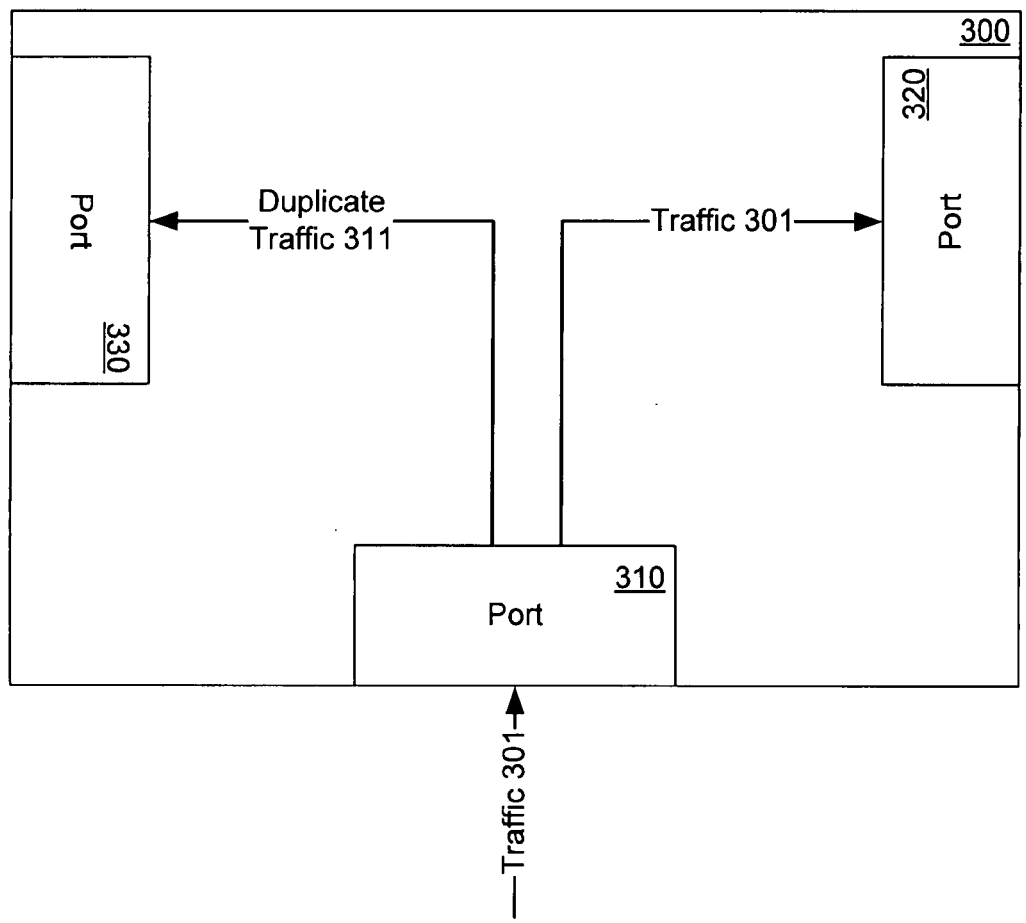
FIG. 3A is an exemplary switch, in accordance with one embodiment.

With reference to FIG. 3A, an exemplary switch 300 is depicted, showing the functionality of port mirroring. While exemplary switch 300 is shown as containing specific, enumerated features, it is understood that embodiments are well suited to applications involving fewer, additional, or different features and arrangements.

Exemplary switch 300 is shown as receiving some network traffic 301 via port 310. In the depicted embodiment, port 310 is configured to utilize port mirroring, by passing the original traffic through to one port, e.g., port 320, and creating a duplicate of the traffic and passing it to a second port, e.g., port 330. As depicted, network traffic 301 is passed through port 310 to port 320, for delivery to its intended destination. Meanwhile, port 310 creates duplicate network traffic 311, and passes duplicate network traffic 311 to port 330, e.g., for monitoring purposes.

MAC Learning and VLAN Flooding

Media Access Control (MAC) address learning, or MAC learning, is a means by which a receiving port in a layer 2 device "learns" how to reach various destinations. In one approach, the source MAC address of every packet received by the port is stored, such that the port will recognize future packets intended for a known recipient, and forward those packets to the appropriate connection.

When a packet with an unknown destination is received, the port will forward that packet to all available connections, thereby "flooding" the network with copies of that packet. This behavior can be modified, e.g., by limiting flooding to ports in the same VLAN as the receiving port. The combination of MAC learning and VLAN flooding helps to minimize traffic on the network, by only utilizing flooding where the destination of particular packets is not known.

Figure 3B:
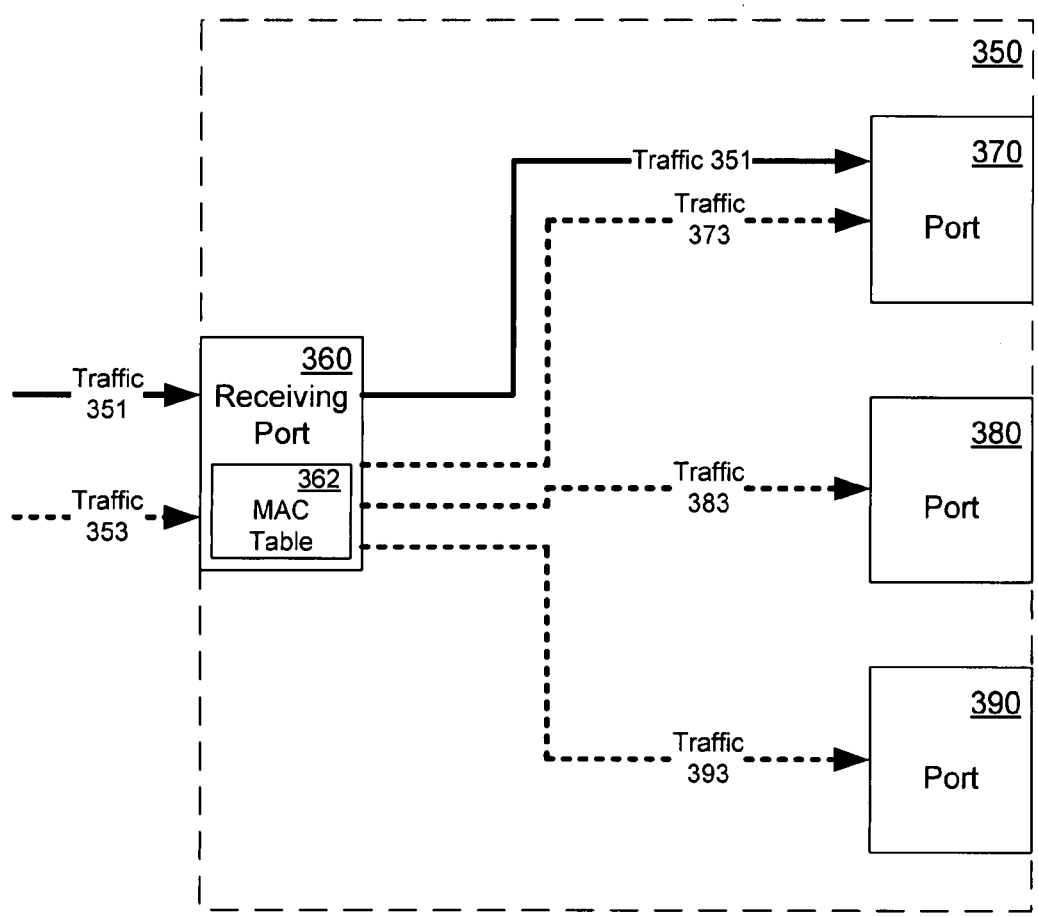
FIG. 3B is an exemplary VLAN, in accordance with one embodiment.

With reference to FIG. 3B, an exemplary VLAN 350 is depicted, in accordance with one embodiment. In the depicted embodiment, MAC learning has been implemented for VLAN 350, such that traffic with known destinations will be passed through VLAN 350 efficiently, while traffic with unknown destinations will be flooded across all available ports.

VLAN 350 is shown as including ports 360, 370, 380, and 390. In the depicted embodiment, port 360 is a receiving port, and receives network traffic 351 and network traffic 353. When determining how to route received network traffic, receiving port 360 compares the destination of the network traffic with MAC address table 362, to determine if the intended destination is known. In the depicted embodiment, network traffic 351 corresponds to a known destination in MAC address table 362, and is routed to port 370. Network traffic 353, however, does not have a known destination. Accordingly, port 360 floods VLAN 350 with copies of network traffic 353; copies 373, 383, and 393 are sent to every other available port in VLAN 350.

Method of Duplicating Network Traffic

Figure 4:
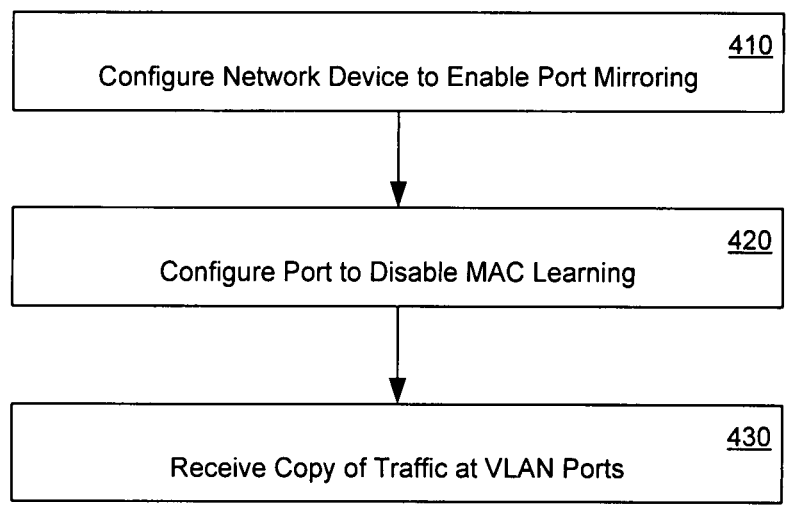
FIG. 4 is a flowchart of a method of duplicating network traffic, in accordance with one embodiment.

With reference now to FIG. 4, a flowchart 400 of a method of duplicating network traffic is depicted, in accordance with one embodiment. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed.

With reference to step 10, a network device is configured to enable port mirroring. In some embodiments, port mirroring is used to create a duplicate copy of network traffic, without impacting the original traffic. This duplicate traffic can be forwarded to a receiving port, while the original is passed through the network device to its intended destination. Here the duplicate traffic is forwarded to another port in the network device. In this embodiment, this port is part of a defined "monitoring" VLAN; the other ports in the monitoring VLAN are used with various monitoring devices. If additional monitoring devices are desired, other ports may be added to the monitoring VLAN, and those devices connected to the new ports.

With reference to step 420, the receiving port is configured to disable MAC learning. By disabling MAC learning for the receiving port, VLAN traffic received at that port will be flooded to every other port in the same VLAN.

With reference now to step 430, a copy of the network traffic is received at every port in the monitoring VLAN. In this way, this embodiment allows for an arbitrary number of copies of network traffic to be generated, and dispatched to arbitrary ports in a network device. The described approach does not require additional expense of hardware to be placed in-line with the network, and provides a scalable approach to the problems of network monitoring.

Monitoring Traffic in a Network Device

Figure 5A:
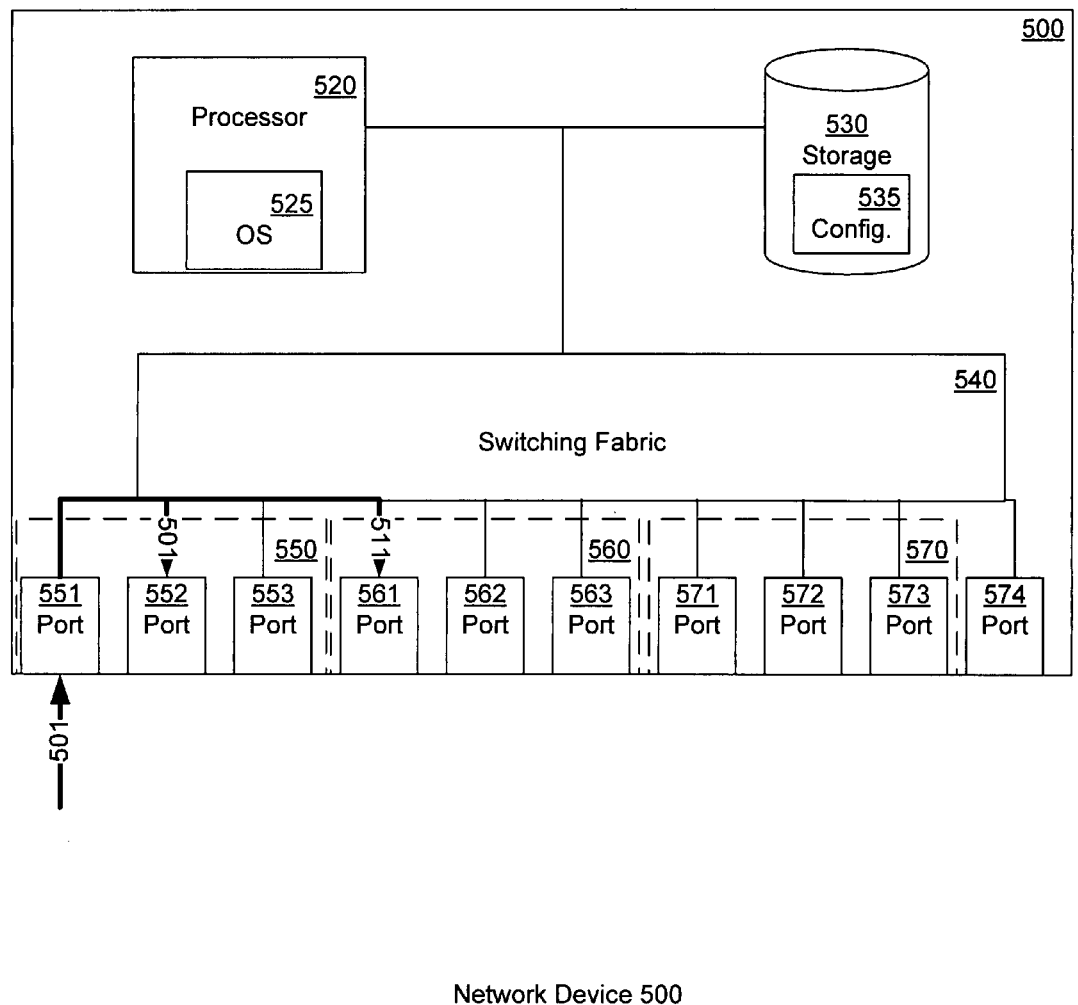
FIG. 5A is a depiction of the flow of network traffic through an exemplary network device, in accordance with one embodiment.
Figure 5B:
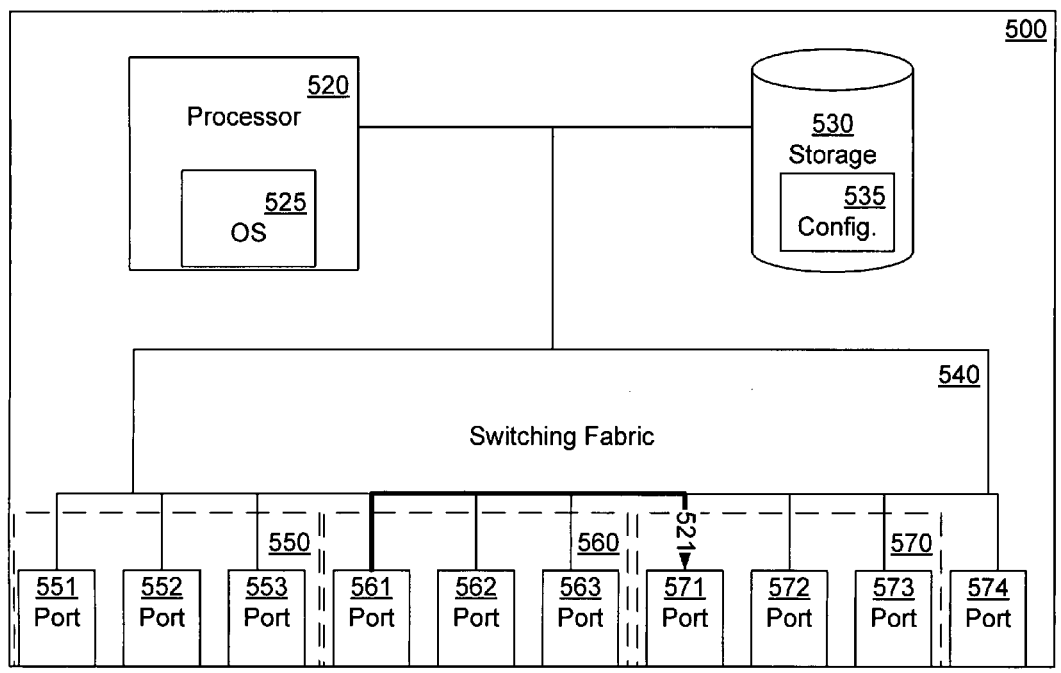
FIG. 5B is a depiction of the flow of network traffic through an exemplary network device, in accordance with one embodiment.
Figure 5C:
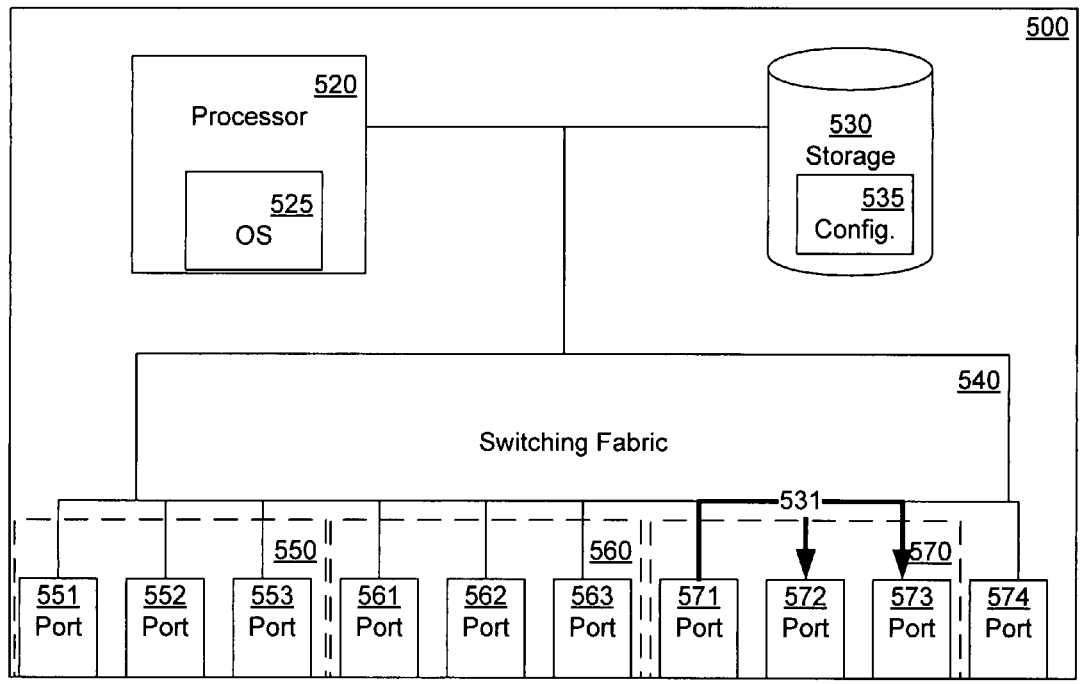
FIG. 5C is a depiction of the flow of network traffic through an exemplary network device, in accordance with one embodiment.

With reference now to FIGS. 5A through 5C, the flow of network traffic through a network device 500 is depicted, in accordance with one embodiment. While network device 500 is shown as incorporating specific, enumerated features, it is understood that embodiments are well suited to applications involving additional, fewer, or different features or arrangements. Moreover, while network device 500, as shown, is a layer 2 device, it is understood that embodiments may be practiced on many different types of devices, e.g., a layer 2/3 device.

As shown, network device 500 includes processor 520, storage 530, switching fabric 540, and a number of communications ports, e.g., ports 551, 552, 553, 561, 562, 563, 571, 572, 573, and 574. An operating system 525 is shown as executing on processor 520. A configuration 535 is shown as being stored within storage 530.

Figure 6:
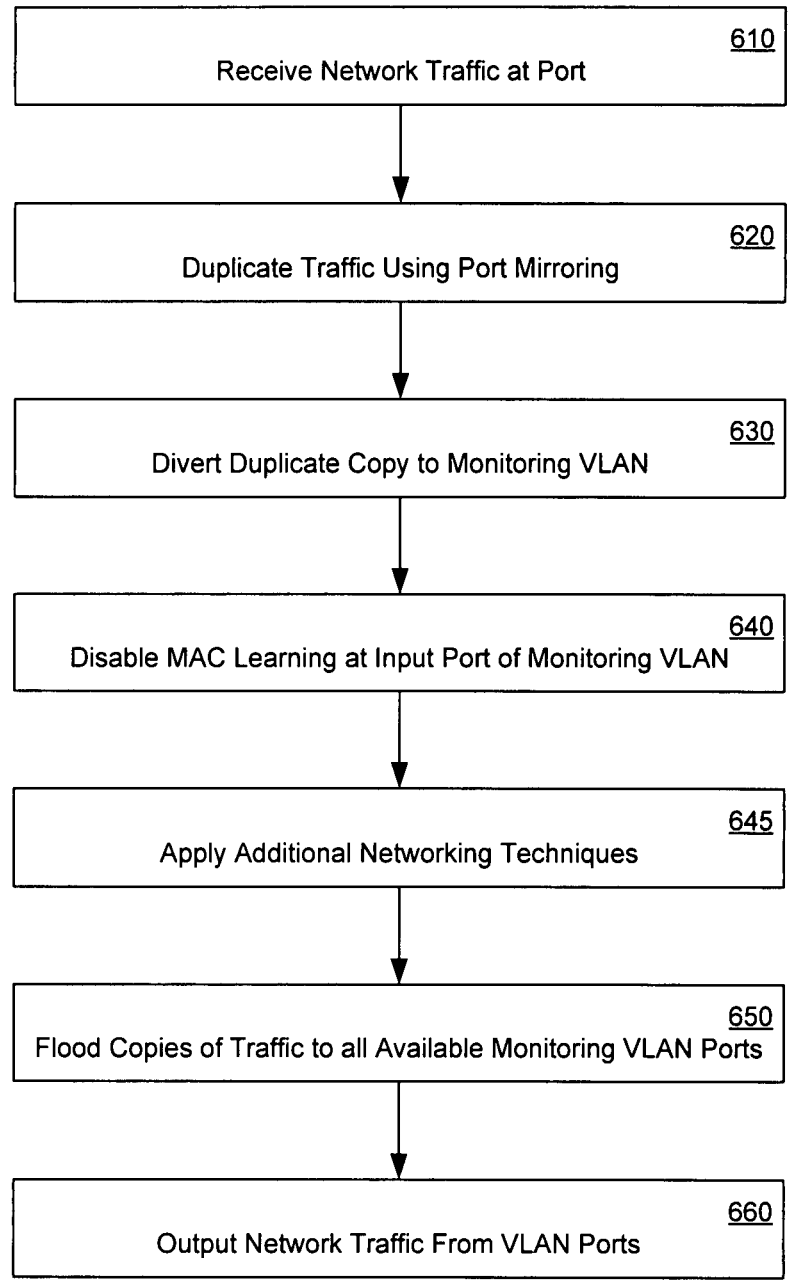
FIG. 6 is a flowchart of a method of monitoring traffic on a network device, in accordance with one embodiment.

With reference now to FIG. 6, a flowchart 600 of a method of monitoring traffic on a network device is depicted, in accordance with one embodiment. Although specific steps are disclosed in flowchart 600, such steps are exemplary. That is, embodiments of the present invention are well suited to performing various other (additional) steps or variations of the steps recited in flowchart 600. It is appreciated that the steps in flowchart 600 may be performed in an order different than presented, and that not all of the steps in flowchart 600 may be performed.

With reference now to step 610, network traffic is received by a port in the network device. In the depicted embodiment, the received traffic is identified as traffic to be monitored. In different embodiments, this determination can be performed in different ways. For example, traffic may be identified as of interest if it is intended for a specified recipient, originates from a specified sender, conforms to a particular protocol, is intended for a specified VLAN, or any combination of these elements, or any other identifier of interest.

For example, with reference to FIGS. 5A through 5C, port 551 receives network traffic 501, which is identified as traffic to be monitored.

With reference now to step 620, the network device uses port mirroring to create a duplicate copy of the network traffic to be monitored. In some embodiments, the original traffic is allowed to pass through the network device uninterrupted. In some embodiments, network devices, such as layer 2 devices, can be configured to "mirror" traffic; a duplicate copy of the traffic is created, while the original traffic passes through the network device unhindered. The duplicate copy of the traffic can be routed to another port in the network device.

In different embodiments, different approaches may be utilized to initiate and configure port mirroring. For example, in one embodiment, configuration 535 includes appropriate commandline interface (CLI) commands to instruct OS 525 to configure port 551 (or a portion of switching fabric 540 associated with port 551) to implement port mirroring.

Continuing the above example, port 551 is configured to use port mirroring create a duplicate copy of traffic 501, duplicate 511. Network traffic 501 is routed by switching fabric 540 through network device 502 to the appropriate port, e.g., port 552, for delivery to its intended destination. Duplicate 511, meanwhile, is routed to another port, e.g., port 561.

With reference now to step 630, the duplicate copy of the network traffic is diverted to a monitoring VLAN. In some embodiments, several ports in the network device may be associated with a particular VLAN. As explained in greater detail, below, associating the various ports used for monitoring traffic into a VLAN offers some advantages, in terms of flexibility and extensibility of the monitoring system.

Continuing the preceding example, port 561 routes duplicate traffic 511 to VLAN 570, as indicated by arrow 521, where it is received by port 571.

With reference now to step 640, MAC learning is disabled for the input port of the monitoring VLAN. In some embodiments, MAC learning may be selectively disabled. For example, if only specific types of traffic are of interest to every monitoring port in the monitoring VLAN, it may be desirable to route most of the traffic to a single monitoring port, while flooding the traffic across the entire monitoring VLAN if it meets certain specified criteria. Such criteria might include a particular VLAN identifier, or traffic that corresponds to a specific protocol, or a particular sender, receiver, or combination of those. In another embodiment, other criteria may be utilized for determining whether to disable MAC learning. Also, by only selectively disabling MAC learning, the input port of the monitoring VLAN may be used for other non-monitoring functions.

In different embodiments, MAC learning may be disabled by different approaches. For example, in one embodiment, a specific memory location, e.g., in storage 530, needs be modified to specifically disable MAC learning, by modifying a register value associated with that port. In another embodiment, e.g., where OS 525 supports a commandline interface (CLI) command to disable MAC learning, configuration 535 may include an appropriate CLI command to (selectively) disable MAC learning for the specified port.

Continuing the preceding example, MAC learning is disabled for port 571.

With reference now to step 645, in some embodiments, additional networking rules and/or techniques may be applied to the duplicated traffic. In some embodiments, some or all of the normal techniques and approaches available in manipulating network traffic flow can be utilized, in conjunction with this approach to network monitoring. For example, in one approach, an access control list (ACL) can be utilized to further subdivide the monitoring VLAN. Such an approach would be useful in order to, for example, route all voice over IP (VOIP) traffic to several of the ports in the monitoring VLAN, while not flooding all of the monitoring ports. Utilization of these network rules and techniques allows for finer grained control over traffic duplication and network monitoring.

With reference now to step 650, the receiving VLAN port forwards a copy of the duplicate traffic to all available ports in the monitoring VLAN. BY disabling MAC learning, the input port for the monitoring VLAN is forced to use VLAN flooding, regardless of the specified destination for the duplicate traffic. In this way, an arbitrary number of copies of network traffic can be created, for network monitoring. Simply by adding or removing ports in the VLAN, additional or fewer copies of traffic are automatically generated. In some embodiments, as previously noted, which ports are available in the monitoring VLAN may be modified, e.g., by application of additional network rules or techniques.

With reference to the preceding example, port 571 floods VLAN 570 with additional copies of duplicate 511, as indicated by arrow 531. For every other port in VLAN 570, a different copy is generated. By adding additional ports to VLAN 570, e.g., by adding port 574, an additional copy of the duplicate traffic would be automatically generated and forwarded to that port.

With reference now to step 660, a copy of the network traffic is output by each available port in the monitoring VLAN. By connecting monitoring devices to the various ports in the monitoring VLAN, copies of the network traffic of interest are forwarded to the monitoring devices. As such, the above described method allows for a single network device to generate an arbitrary number of copies of network traffic, and forward those copies to various arbitrary ports in a defined VLAN.

Creating Copies of Network Traffic

Figure 7:
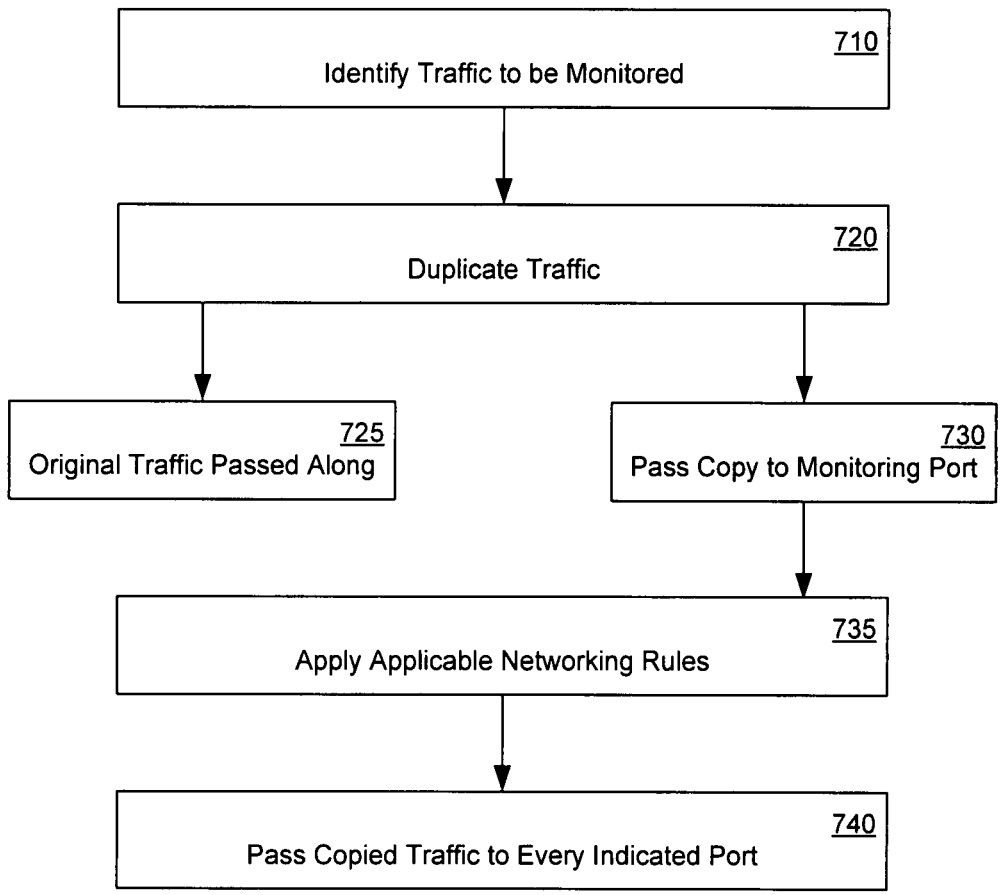
FIG. 7 is a flowchart of a method of creating copies of network traffic, in accordance with one embodiment.

With reference now to FIG. 7, a flowchart 700 of a method of creating copies of network traffic is depicted, in accordance with one embodiment. Although specific steps are disclosed in flowchart 700, such steps are exemplary. That is, embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed.

With reference to step 710, in some embodiments, network traffic of interest is identified. In different embodiments, different approaches may be utilized to flag specific network traffic as of interest. For example, in one embodiment, all network traffic may be so identified. In another embodiment, the originating source of the network traffic, or the intended destination, or the combination of those elements may be sufficient to identify network traffic as interesting. In another embodiment, the specific protocol being utilized by the network traffic, or the contents of that traffic may determine whether network traffic is of interest.

With reference now to step 720, the identified network traffic is duplicated. In some embodiments, a copy of the network traffic is created, e.g., using port mirroring. In another embodiment, other approaches may be utilized to create a copy of the network traffic, e.g., by using a physical tap to divert a portion of the signal.

With reference to step 725, the network traffic is passed along unhindered. In some embodiments, e.g., an embodiment where port mirroring is utilized, the original network traffic is allowed to pass through the network device, and is forwarded to its intended destination.

With reference to step 730, a copy of the network traffic is passed to a monitoring port. For example, the duplicate copy of the network traffic may be directed to a specific port in a layer 2 device, e.g., a monitoring port included in a VLAN.

With reference to step 735, any applicable networking rules are applied. For example, if certain networking rules are defined to apply to traffic passing through the monitoring port, e.g., an access control list, such networking rules may influence how the copy of the network traffic is handled, or the destination or destinations to which it is eventually routed.

With reference to step 740, the monitor port transmits the copy of the network traffic to each of a plurality of indicated ports. In different embodiments, different approaches are utilized in implementing this step. For example, in one embodiment, every indicated port is part of the same VLAN as the monitoring port. By disabling MAC learning for the monitoring port, the monitoring port can be compelled to flood the VLAN with copies of the network traffic.

Transparent VLAN Flooding

In different embodiments, approaches similar to that described above can be applied to different applications. Across different applications, the source of the network traffic to be flooded across a VLAN may differ: for example, in one embodiment, port mirroring may be used to duplicate network traffic, while in another embodiment, network traffic may be initially received into the monitoring VLAN, and one or more of the copies created through VLAN flooding is routed to its intended destination.

Figure 8:
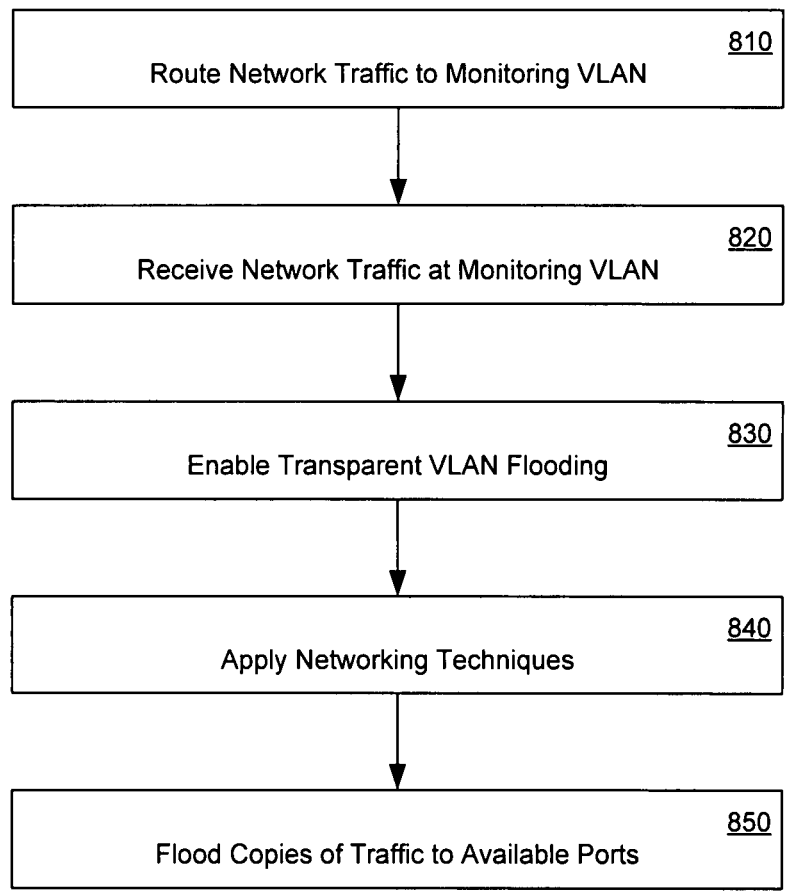
FIG. 8 is a flowchart of a method of transparent VLAN flooding, in accordance with one embodiment.

With reference now to FIG. 8, a flowchart 800 of a method of transparent VLAN flooding is depicted, in accordance with one embodiment. Although specific steps are disclosed in flowchart 800, such steps are exemplary. That is, embodiments of the present invention are well suited to performing various other (additional) steps or variations of the steps recited in flowchart 800. It is appreciated that the steps in flowchart 800 may be performed in an order different than presented, and that not all of the steps in flowchart 800 may be performed.

In step 810, network traffic is routed to a monitoring VLAN. As noted above, the source of network traffic may vary, across different embodiments. Several such embodiments are depicted below, with reference to FIGS. 9B, 10B, and 11B. Similarly, in different embodiments, the network traffic routed to the monitoring VLAN may be original, or a duplicate.

In step 820, the network traffic is received at the monitoring VLAN. In some embodiments, a particular port in a monitoring VLAN serves as an input port, and traffic routed to the monitoring VLAN is received into this input port.

In step 830, transparent VLAN flooding is enabled. Transparent VLAN flooding is used to create duplicate copies of received network traffic, and flood them across the monitoring VLAN. In some embodiments, transparent VLAN flooding is implemented by disabling MAC address learning for the input port for the monitoring VLAN.

With reference now to step 840, in some embodiments, additional networking techniques are applied. For example, in some embodiments, access control lists (ACLs) may be utilized, to restrict where duplicate copies of the received network traffic are routed, within the monitoring VLAN.

With reference now to step 850, copies of the received traffic are flooded to the available ports within the monitoring VLAN. For example, in an embodiment where transparent VLAN flooding is implemented through disabling MAC address learning, and an ACL is used to limit which ports receive copies of traffic, those ports in the monitoring VLAN which are not blocked by the ACL will receive a copy of the network traffic.

Transparent VLAN Flooding and Port Mirroring

As discussed above, in different embodiments, different approaches are utilized for routing network traffic to a monitoring VLAN, for use with transparent VLAN flooding. One such approach involves port mirroring as a source for duplicate network traffic.

Figure 9A:
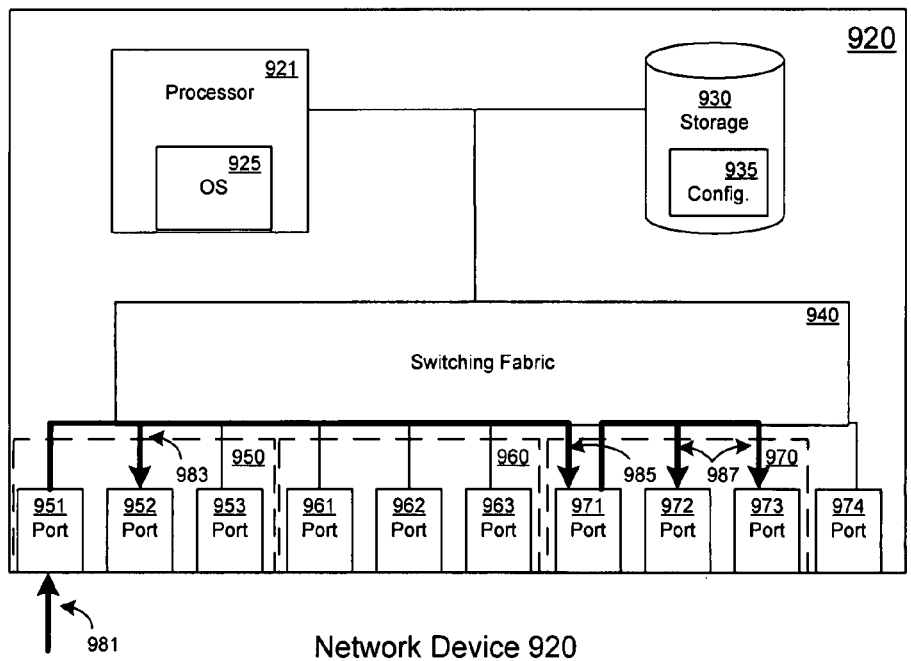
FIG. 9A is a depiction of the flow of network traffic through an exemplary network device, in accordance with one embodiment.

With reference now to FIG. 9A, the flow of network traffic through a network device 920 is depicted, in accordance with one embodiment. While network device 920 is shown as incorporating specific, enumerated features, it is understood that embodiments are well suited to applications involving additional, fewer, or different features or arrangements. Moreover, while network device 920, as shown, is a layer 2 device, it is understood that embodiments may be practiced on many different types of devices, e.g., a layer 2/3 device.

As shown, network device 920 includes processor 921, storage 930, switching fabric 540, and a number of communications ports, e.g., ports 951, 952, 953, 961, 962, 963, 971, 972, 973, and 974. An operating system 925 is shown as executing on processor 921. A configuration 935 is shown as being stored within storage 930.

Figure 9B:
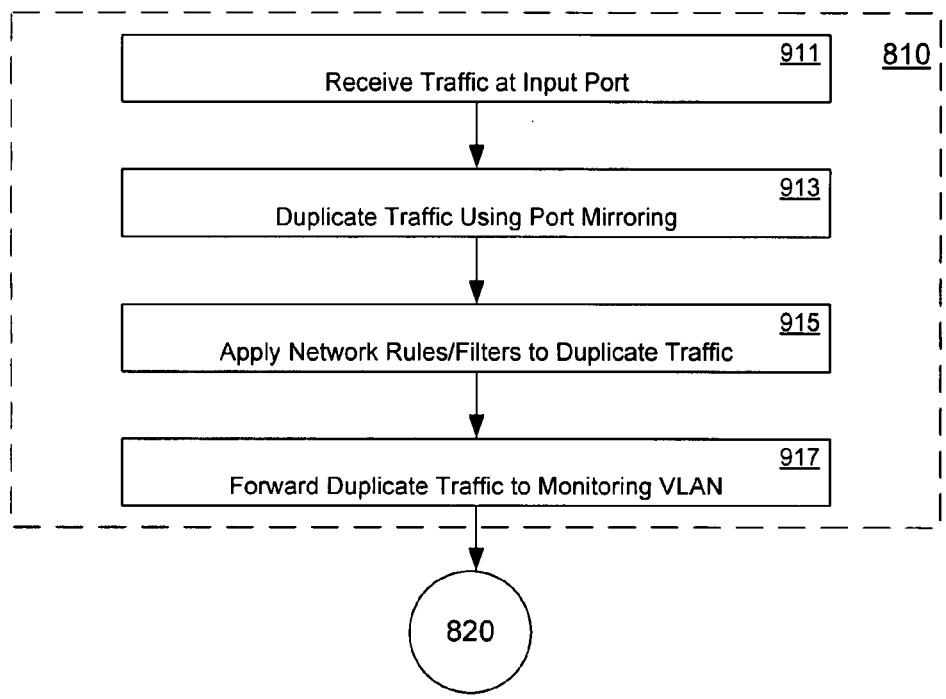
FIG. 9B is a flowchart of a method of utilizing transparent VLAN flooding in conjunction with port mirroring, in accordance with one embodiment.

With reference now to FIG. 9B, a flowchart 900 of a method of utilizing transparent VLAN flooding in conjunction with port mirroring is depicted, in accordance with one embodiment. Although specific steps are disclosed in flowchart 900, such steps are exemplary. That is, embodiments of the present invention are well suited to performing various other (additional) steps or variations of the steps recited in flowchart 900. It is appreciated that the steps in flowchart 900 may be performed in an order different than presented, and that not all of the steps in flowchart 900 may be performed.

In one embodiment, the method of flowchart 900 is intended to replace step 810 in flowchart 800, e.g., such that the method of flowchart 900 serves to generate and route network traffic to monitoring VLAN.

With reference to step 911, network traffic is received at an input port in a network device. In the depicted embodiment, the network traffic is intended for a destination indicated by information contained in the network traffic. For example, with reference to FIG. 9A, network traffic 981 is received into network device 920 at port 951.

With reference to step 913, a duplicate copy of the received traffic is created. In some embodiments, network traffic is created using a port mirroring technique, such as that described previously. The original traffic is then passed through the network device to its intended destination. For example, the received network traffic is routed through network device 920, as indicated by arrow 983.

With reference to step 915, in some embodiments, network rules or filters can be applied to the duplicate traffic. For example, the duplicate traffic can be subjected to an access control list, so as to determine where to route the duplicate copy.

With reference to step 917, the duplicate traffic is forwarded to the monitoring VLAN. For example, the duplicate traffic is passed from port 951 to monitoring VLAN input port 971, as indicated by arrow 985.

The method of flowchart 900, as shown, serves as a replacement for step 810 of flowchart 800. As such, the method of flowchart 900 is intended to flow into step 820, where the network traffic is received by the monitoring VLAN, and eventually copies of the traffic are flooded to all available ports within the monitoring VLAN. For example, copies of the network traffic are passed to the other ports within monitoring VLAN 970, as indicated by arrows 987.

Transparent VLAN Flooding and in-Line Taps

As discussed previously, one approach for creating a duplicate copy of network traffic involves inserting an in-line tap into a network line. Transparent VLAN flooding can be used in conjunction with such an in-line tap, in order to create numerous duplicate copies from a single copy, without further reducing signal strength in the network line.

Figure 10A:
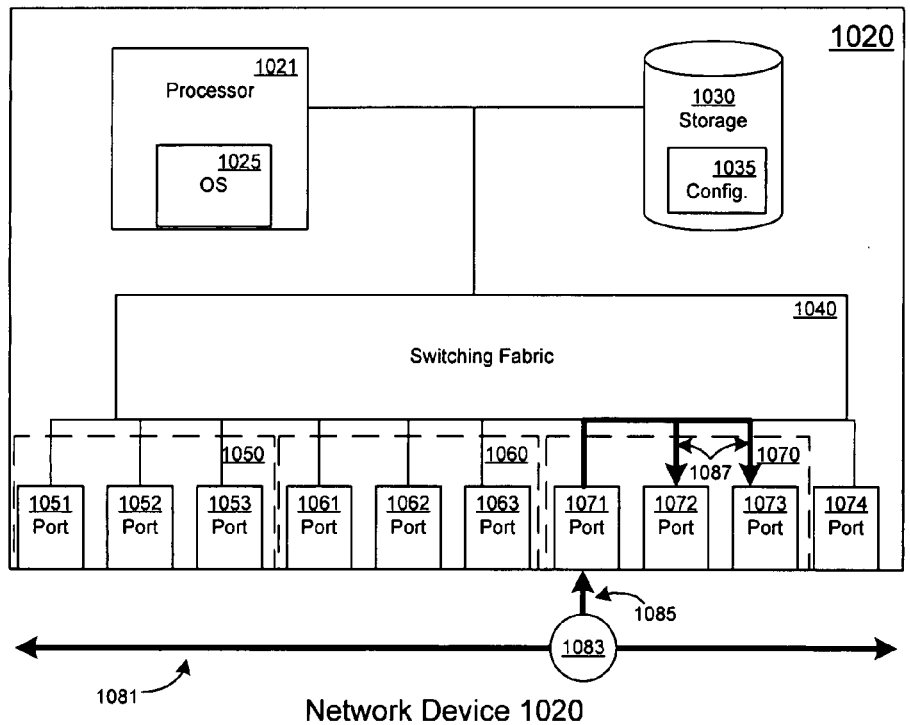
FIG. 10A is a depiction of the flow of network traffic through an exemplary network device, in accordance with one embodiment.

With reference now to FIG. 10A, the flow of network traffic through a network device 1020 is depicted, in accordance with one embodiment. While network device 1020 is shown as incorporating specific, enumerated features, it is understood that embodiments are well suited to applications involving additional, fewer, or different features or arrangements. Moreover, while network device 1020, as shown, is a layer 2 device, it is understood that embodiments may be practiced on many different types of devices, e.g., a layer 2/3 device.

As shown, network device 1020 includes processor 1021, storage 1030, switching fabric 540, and a number of communications ports, e.g., ports 1051, 1052, 1053, 1061, 1062, 1063, 1071, 1072, 1073, and 1074. An operating system 1025 is shown as executing on processor 1021. A configuration 1035 is shown as being stored within storage 1030.

Figure 10B:
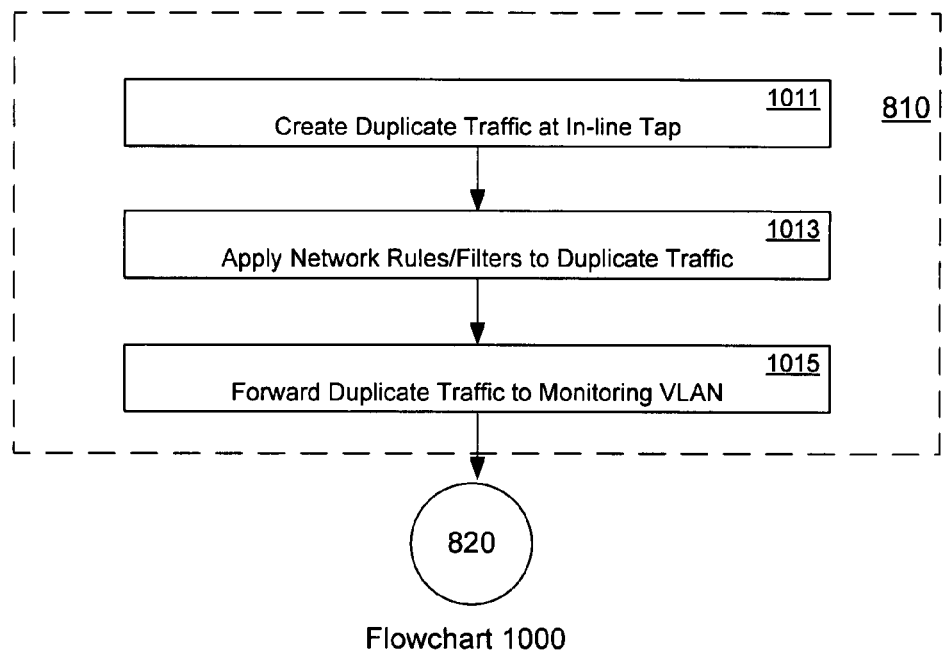
FIG. 10B is a flowchart of a method of utilizing transparent VLAN flooding in conjunction with an in-line tap, in accordance with one embodiment.

With reference now to FIG. 10B, a flowchart 1000 of a method of utilizing transparent VLAN flooding in conjunction with an in-line tap is depicted, in accordance with one embodiment. Although specific steps are disclosed in flowchart 1000, such steps are exemplary. That is, embodiments of the present invention are well suited to performing various other (additional) steps or variations of the steps recited in flowchart 1000. It is appreciated that the steps in flowchart 1000 may be performed in an order different than presented, and that not all of the steps in flowchart 1000 may be performed.

With reference now to step 1011, a duplicate copy of network traffic is created by an in-line tap. In different embodiments, different in-line taps may be utilized. For instance, in one embodiment, a fiber-optic cable carrying a network signal is tapped, such that a portion of the light contained therein is diverted.

For example, with reference to FIG. 10A, network traffic 1081 is intercepted by in-line tap 1083. A portion of the signal making up network traffic 1081 is diverted, and a somewhat diminished signal continues to the intended destination, as indicated by arrow 1082.

With reference now to step 1013, in some embodiments, network rules or filters can be applied to the duplicate traffic. For example, the duplicate traffic can be subjected to an access control list, so as to determine where to route the duplicate copy. These embodiments allow for selectively routing duplicate traffic, e.g., to route different types of duplicate traffic to different destinations.

With reference now to step 1015, the duplicate copy of the network traffic is forwarded to the monitoring VLAN. In some embodiments, the diverted signal is passed to a network device which implements transparent VLAN flooding, in order to generate multiple copies of the network traffic. For example, as indicated by arrow 1085, the diverted portion of the signal for traffic 1081 is passed to network device 1020, and specifically to monitoring VLAN input port 1071.

The method of flowchart 1000, as shown, serves as a replacement for step 810 of flowchart 800. As such, the method of flowchart 1000 is intended to flow into step 820, where the network traffic is received by the monitoring VLAN, and eventually copies of the traffic are flooded to all available ports within the monitoring VLAN. For example, copies of the network traffic are passed to the other ports within monitoring VLAN 1070, as indicated by arrows 1087.

Transparent VLAN Flooding and Network Traffic Sources

Transparent VLAN flooding can also be used in scenarios where the original network traffic is passed to a monitoring VLAN, rather than diverting a copy of the traffic to the VLAN. For example, a traffic source, such as a computer, may direct traffic directly to the monitoring VLAN, in order to generate numerous copies of the traffic.

Figure 11A:
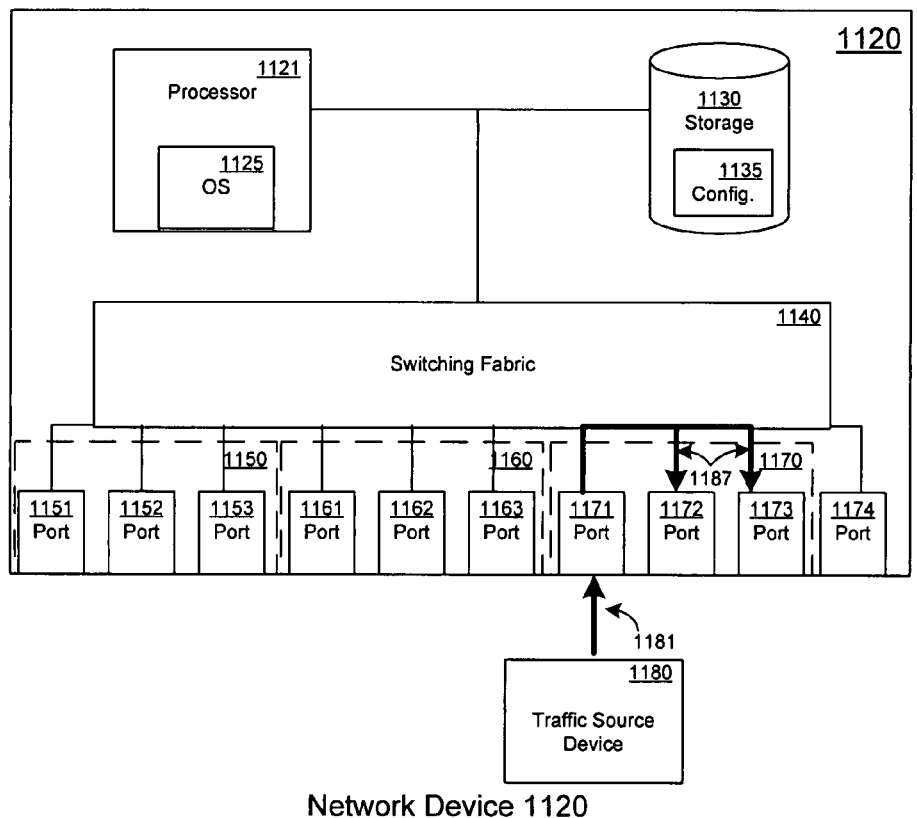
FIG. 11A is a depiction of the flow of network traffic through an exemplary network device, in accordance with one embodiment.

With reference now to FIG. 11A, the flow of network traffic through a network device 1120 is depicted, in accordance with one embodiment. While network device 1120 is shown as incorporating specific, enumerated features, it is understood that embodiments are well suited to applications involving additional, fewer, or different features or arrangements. Moreover, while network device 1120, as shown, is a layer 2 device, it is understood that embodiments may be practiced on many different types of devices, e.g., a layer 2/3 device.

As shown, network device 1120 includes processor 1121, storage 1130, switching fabric 540, and a number of communications ports, e.g., ports 1151, 1152, 1153, 1161, 1162, 1163, 1171, 1172, 1173, and 1174. An operating system 1125 is shown as executing on processor 1121. A configuration 1135 is shown as being stored within storage 1130.

Figure 11B:
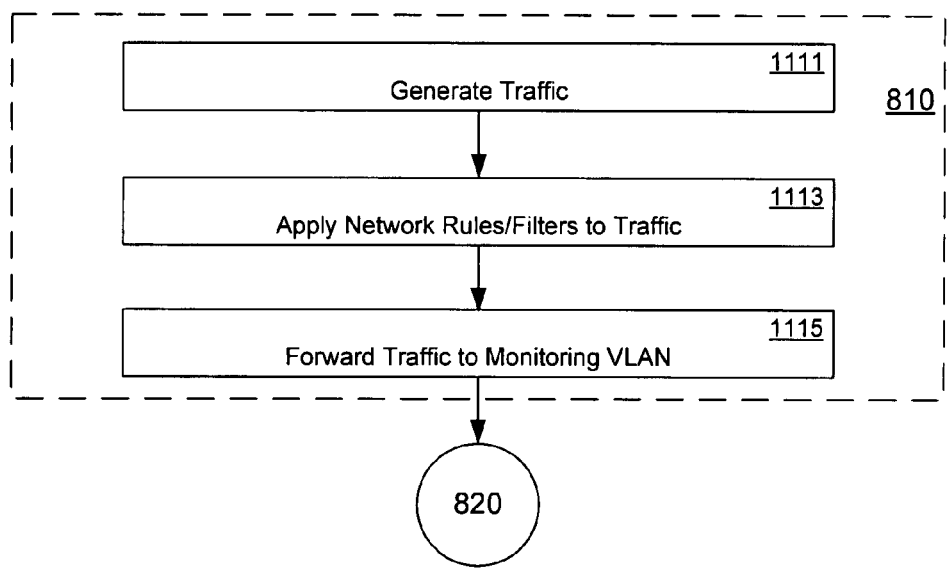
FIG. 11B is a flowchart of a method of utilizing transparent VLAN flooding in conjunction with a network traffic source, in accordance with one embodiment.

With reference now to FIG. 11B, a flowchart 1100 of a method of utilizing transparent VLAN flooding in conjunction with a network traffic source is depicted, in accordance with one embodiment. Although specific steps are disclosed in flowchart 1100, such steps are exemplary. That is, embodiments of the present invention are well suited to performing various other (additional) steps or variations of the steps recited in flowchart 1100. It is appreciated that the steps in flowchart 1100 may be performed in an order different than presented, and that not all of the steps in flowchart 1100 may be performed.

With reference to step 1111, a network traffic source generates network traffic. In different embodiments, different types of network traffic sources may generate different types of network traffic.

With reference to step 1113, in some embodiments, network rules or filters can be applied to the traffic. For example, the traffic can be subjected to an access control list, so as to determine where to route the duplicate copy. Such embodiments allow traffic to be further manipulated, prior to passing it to the monitoring VLAN. For example, different types of traffic may be routed to different input ports, or different VLANs.

With reference now to step 1115, the network traffic is forwarded to a monitoring VLAN. For example, with reference to FIG. 11A, traffic source device 1180 generates network traffic 1181, and forwards it to network device 1120, specifically to monitoring VLAN input port 1171.

The method of flowchart 1100, as shown, serves as a replacement for step 810 of flowchart 800. As such, the method of flowchart 1100 is intended to flow into step 820, where the network traffic is received by the monitoring VLAN, and eventually copies of the traffic are flooded to all available ports within the monitoring VLAN. For example, copies of the network traffic are passed to the other ports within monitoring VLAN 1170, as indicated by arrows 1187.

Further, in some embodiments, such as the method described by flowchart 1100, a copy of the network traffic may be passed to any desired destination. For example, one port within the monitoring VLAN may be configured to route a copy of the network traffic outside the monitoring VLAN, e.g., to another VLAN, to a specified MAC address, to a specified IP address, or to any other recognized network destination. In this way, copies of the network traffic may be passed to several different VLANs, perhaps to be further duplicated by another monitoring VLAN.

Embodiments of the present invention are thus described. While the present invention has been described in particular embodiments, it should be appreciated that the present invention should not be construed as limited by such embodiments, but rather construed according to the following claims.

What is claimed is:

1. A method of creating multiple copies of network traffic, the method comprising:
   receiving network traffic at a first port of a first network device, wherein said first network device comprises a plurality of ports;
   producing a duplicate copy of said network traffic, wherein said duplicate copy comprises an address to a second network device, wherein said network traffic is intended for delivery to said address;
   forwarding from said first port said duplicate copy to a second port of said first network device, wherein said second port is not associated with said address;
   forwarding from said second port said duplicate copy to a monitoring I/O port of said first network device;
   configuring said monitoring I/O port as input for a monitoring VLAN (virtual local area network);
   configuring said monitoring I/O port and a grouping of ports into said monitoring VLAN, wherein said grouping of ports is taken from said plurality of ports, and wherein said grouping does not include said second port;
   disabling media access control (MAC) address learning for said monitoring I/O port for purposes of delivering said duplicate copy of said network traffic to all of said grouping of ports in said monitoring VLAN; and
   said monitoring I/O port transmitting a plurality of copies of said duplicate copy to said grouping of ports corresponding to at least one network monitoring device, wherein at least one copy of said plurality of copies is created without encapsulation.

2. The method of claim 1, further comprising:
   identifying said network traffic as traffic to be duplicated.

3. The method of claim 2, wherein said identifying comprises determining if said network traffic matches a defined parameter.

4. The method of claim 3, wherein said defined parameter comprises a specified networking protocol.

5. The method of claim 3, wherein said defined parameter comprises a specified recipient network address.

6. The method of claim 3, wherein said defined parameter comprises a specified sender network address.

7. The method of claim 1, wherein said receiving comprises receiving said network traffic into a network device via one of plurality of ports.

8. The method of claim 1, wherein said producing said duplicate copy comprises:
   configuring a port to implement port mirroring; and
   applying said port mirroring to said network traffic to produce said duplicate copy.

9. The method of claim 1, wherein said forwarding said plurality of copies of said duplicate copy comprises:
   flooding said monitoring VLAN with said plurality of copies.

10. The method of claim 1, further comprising:
    transmitting said network traffic to a specified destination.

11. The method of claim 1, further comprising:
    applying a defined network rule to said duplicate copy at said monitoring I/O port.

12. A network device, comprising:
    a plurality of networking ports for receiving data into said network device and transmitting data out of said networking device; and
    a switching fabric, coupled to said plurality of networking ports, for routing network traffic between said plurality of networking ports,
    wherein said plurality of networking ports includes:
      a plurality of monitoring ports, for outputting network traffic from said network device;
      an input port, for receiving network traffic and configured to create a duplicate copy of said network traffic wherein said duplicate copy comprises an address to a second network device, wherein said network traffic is intended for delivery to said address; and
      a monitoring input port configured as a monitoring VLAN (virtual local area network) input, coupled to said input port, for receiving said duplicate copy of said network traffic, and configured to create a plurality of copies of said duplicate copy and forward said plurality of copies to said plurality of monitoring ports, wherein said monitoring input port and said plurality of monitoring ports are part of said monitoring VLAN, wherein at least one copy of said plurality of copies is created without encapsulation, and wherein media access control (MAC) address learning for said monitoring input port is disabled for purposes of delivering said duplicate copy of said network traffic to all of said plurality of monitoring ports in said monitoring VLAN.

13. The network device of claim 12, further comprising:
a processor coupled to said switching fabric for executing instructions on said network device;
an operating system, executing on said processor, for controlling said network device;
a storage device, coupled to said processor, for storing information; and
a configuration, stored on said storage device, for configuring said network device.

14. The network device of claim 13, wherein said configuration comprises an instruction for said operating system to configure said input port to create said duplicate copy.

15. The network device of claim 14, wherein said instruction comprises an instruction to implement port mirroring.

16. The network device of claim 14, wherein said instruction comprises an instruction to selectively implement port mirroring, if a specified condition is detected.

17. The network device of claim 13, wherein said configuration comprises an instruction for said operating system to configure said monitoring input port to create said plurality of copies by disabling media access control (MAC) address learning.

18. The network device of claim 13, wherein said configuration comprises an instruction for said operating system to configure said monitoring input port to create said plurality of copies by selectively disabling media access control (MAC) address learning, if a specified condition is detected.

19. The network device of claim 12, wherein said input port is configured to implement port mirroring to create said duplicate copy.

20. The network device of claim 12, wherein said monitoring input port is configured to disable media access control (MAC) address learning to create said plurality of copies and forward said plurality of copies to said plurality of monitoring ports through the use of VLAN flooding.

21. A non-transitory computer readable storage media having computer readable and computer executable program code embodied therein for causing a computer system to execute a method of monitoring network traffic on a network device comprising:
receiving said network traffic into an input port of a first network device, wherein said first network device comprises a plurality of ports;
duplicating said network traffic at said input port to create duplicate traffic, wherein said duplicate traffic comprises an address to a second network device, and wherein said network traffic is intended for delivery to said address;
diverting said duplicate traffic to a monitoring virtual local area network (VLAN);
receiving said duplicate traffic into a monitoring input port in said monitoring VLAN, wherein said monitoring input port comprises one of said plurality of ports;
forwarding a copy of said duplicate traffic from said monitoring input port to each of a grouping of ports in said monitoring VLAN, wherein said copy is created without encapsulation; and
disabling media access control (MAC) address learning for said monitoring input port for purposes of delivering said copy of said duplicate traffic to all of said grouping of ports in said monitoring VLAN.

22. The computer usable medium of claim 21, wherein said duplicating said network traffic comprises enabling port mirroring for said input port.

23. The computer usable medium of claim 21, wherein said forwarding comprises:
disabling media access control (MAC) address learning for said monitoring input port; and
using VLAN flooding to forward said copy of said duplicate traffic to each of said plurality of ports.

24. The computer usable medium of claim 21, further comprising:
applying a network traffic rule to said duplicate traffic, to determine whether a port in said monitoring VLAN is to receive said copy of said duplicate traffic.

25. The computer usable medium of claim 24, wherein said network traffic rule comprises an access control list (ACL).

26. The computer usable medium of claim 21, further comprising:
outputting said copy of said duplicate traffic from one of said plurality of available ports, for use by a network monitoring device.

27. A method of transparent virtual local area network (VLAN) flooding, the method comprising:
receiving from a first port of a first network device duplicated network traffic at a configurable monitoring VLAN input port of said first network device, wherein said duplicated network traffic comprises an address to a second network device such that network traffic associated with said duplicated network traffic is intended for delivery to said address;
disabling media access control (MAC) address learning for said configurable monitoring VLAN input port for purposes of delivering said duplicated network traffic to a grouping of ports in said monitoring VLAN, wherein said grouping of ports is comprised of ports from a plurality of ports of said first network device; and
forwarding a copy of said duplicated network traffic to each of said grouping of ports in said monitoring VLAN, wherein said copy is created without encapsulation.

28. The method of claim 27, further comprising:
applying a network technique to identify said plurality of available VLAN ports.

29. The method of claim 27, further comprising:
routing said network traffic to said monitoring VLAN.

30. The method of claim 27, further comprising:
receiving original traffic at an input port of a network device;
creating said network traffic from said original traffic via port mirroring; and
forwarding said network traffic to said monitoring VLAN input port.

31. The method of claim 30, further comprising:
applying a network technique to said network traffic.

32. The method of claim 27, further comprising:
creating said network traffic from an original signal received at an in-line tap; and
forwarding said network traffic to said monitoring VLAN input port.

33. The method of claim 27, further comprising:
generating said network traffic at a network traffic source; and
forwarding said network traffic to said monitoring VLAN input port.

* * * * *